July 7, 1970  A. P. WHITE ET AL  3,519,907

REVERSIBLE DRIVE SYSTEM

Filed Jan. 4, 1968  2 Sheets-Sheet 1

Abraham P. White,
Francis Finnegan,
Inventors.
Koenig, Senniger,
Powers and Leavitt,
Attorneys.

United States Patent Office 3,519,907
Patented July 7, 1970

3,519,907
REVERSIBLE DRIVE SYSTEM
Abraham P. White, Attleboro, and Francis Finnegan, Plainville, Mass., assignors to Texas Instruments Incorporated, Dallas, Tex., a corporation of Delaware
Filed Jan. 4, 1968, Ser. No. 695,801
Int. Cl. H02p 1/24
U.S. Cl. 318—122                    11 Claims

ABSTRACT OF THE DISCLOSURE

The drive systems disclosed herein each employ a shunt wound D.C. motor in which the field has a center-tapped winding constituting a pair of field winding sections which are oppositely polarized. The winding sections are alternately energizable from a D.C. source through respective SCR's (silicon controlled rectifiers) to produce reversible rotation of the armature. A respective diode shunts each of the field winding sections thereby providing a circuit for dissipating inductively stored energy in the section being deenergized when the direction of rotation is reversed.

BACKGROUND OF THE INVENTION

This invention relates to a reversible drive system and more particularly to such a system providing rapid reversal of a D.C. motor.

Among the several objects of the present invention may be noted the provision of a reversible drive system in which the direction of rotation of the armature of a D.C. motor is electrically reversed rapidly and smoothly; the provision of such a system in which reversal is provided by current switching using semiconductor elements; the provision of such a system in which only relatively low-level currents are switched by the semi-conductor elements; the provision of such a system which is reliable and which is of relatively simple and inexpensive construction. Other objects and features will be in part apparent and in part pointed out hereinafter.

SUMMARY OF THE INVENTION

Briefly, a reversible drive system according to this invention includes a D.C. motor having an armature and a pair of alternately energizable field winding sections. The armature is connected across a unidirectional current source and respective circuit means are provided, each including a triggerable semiconductor current switching device in series with a respective one of said winding sections, for selectively connecting the field winding sections across the unidirectional current source in shunt with the armature. The winding sections are polarized to produce rotation of the armature in opposite directions and each of the winding sections is shunted by a respective diode. Means are also provided for alternately energizing the switching devices whereby the winding sections can be alternately energized to produce reversible rotation of the armature.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
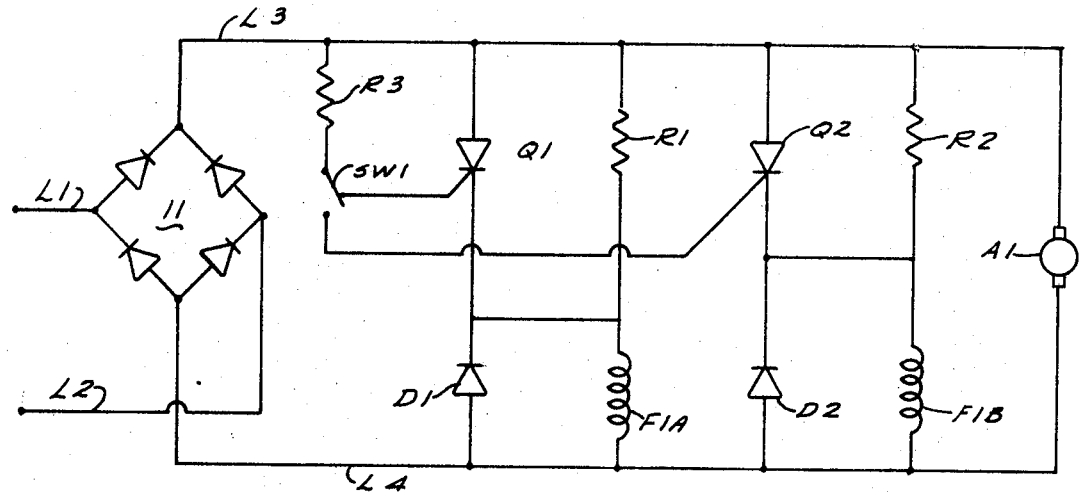
FIG. 1 is a schematic circuit diagram of a reversible drive system according to this invention employing manual control for reversing of the direction of the rotation of a D.C. motor.

Referring now to FIG. 1, the drive system shown there provides reversible rotation of a D.C. motor having an armature A1 and a pair of field winding sections F1A and F1B. Winding sections F1A and F1B are conveniently constituted by a center-tapped field winding, the center tap being constituted by the common connection of the winding sections. The winding sections are thus effectively oppositely polarized.

Unidirectional current for energizing the motor is provided by a full wave bridge rectifier 11. The bridge is energized from a pair of A.C. supply leads L1 and L2 and operates to provide pulsating D.C. to a pair of supply leads L3 and L4. The armature A1 is connected across leads L3 and L4 and is thereby provided with unidirectional current. The center tap or common connection of field winding sections F1A and F1B is connected to the negative lead L4.

Each of the field winding sections F1A and F1B is connected across leads L3 and L4 through a circuit which includes an SCR, Q1 and Q2 respectively. As is understood by those skilled in the art, SCR's Q1 and Q2 are triggerable semiconductor current switching devices which block current flow until triggered and then conduct until the flow of current therethrough in the forward direction is cut off. Each of the field winding sections F1A and F1B is shunted by diode, D1 and D2, respectively. The SCR's Q1 and Q2 are shunted by respective bleed resistors R1 and R2. Current taken from lead L3 through a current limiting resistor R3 is applied to the gate of one or the other of the SCR's through a double-throw switch SW1. Switch SW1 thus constitutes a means for alternately energizing the SCR's which in turn energize the respective field winding sections. Since, in a motor wound for sunt operation, the field current is relatively small in relation to the armature current, it can be seen that the SCR's Q1 and Q2 operate at a relatively low power level and thus may be constituted by relatively inexpensive components.

The operation of this reversible drive system is substantially as follows. When A.C. power is applied through leads L1 and L2, the armature A1 is energized with pulsating direct current. Simultaneously, one of the field winding sections F1A or F1B is energized through the respective SCR Q1 or Q2, the SCR being energized by triggering current provided through resistor R3 and switch SW1. With the switch in the position shown in FIG. 1, the field winding section F1A is energized through the SCR Q1.

If switch SW1 is then reversed, the previously conducting SCR (Q1) ceases to conduct at the end of the current A.C. half cycle when the source voltage provided across leads L3 and L4 momentarily drops to a substantially zero level. The inductance of the respective field winding (F1A) is prevented from maintaining conduction in the previously energized SCR by the diode D1 which provides a path for the inductiviely stored current. As the inherent resistance of the field winding in a shunt wound motor is relatively high, the energy stored in the previously energized field winding (F1A) is relatively quickly dissipated by the current flowing through the loop circuit comprising the field winding and its shunting diode. The resistor (R1) shunting the previously energized SCR (Q1) bleeds any leakage currents and thus assures that the SCR will turn off.

Simultaneously with the de-energization of the gate of the previously energized SCR (Q1), the other SCR (Q2) is triggered into conduction by the current provided through the switch SW1 and the resistor. The unidirectional source voltage is thus then applied across the previously de-energized field winding section F1B, thereby rapidly energizing it. The energization of this winding section (F1B) with the rapid de-energization of the previously energized section (F1A) as described previously causes the direction of rotation of the armature A1 to rapidly and smoothly reverse.

Figure 2:
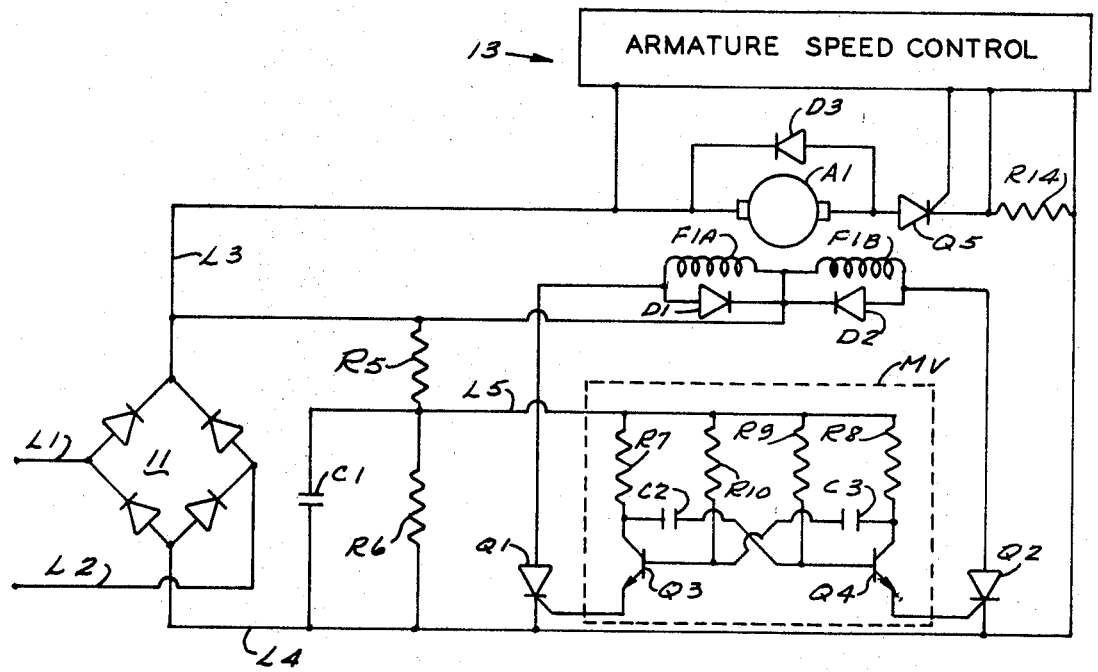
FIG. 2 is a schematic circuit diagram of a drive system employing a transistor multivibrator for effecting timed reversals of a D.C. motor.

In the embodiment illustrated in FIG. 2, the SCR's Q1 and Q2 which control the energization of the field winding sections F1A and F1B are alternately triggered into conduction by an astable transistor multivibrator circuit MV to provide timed reversals of the motor. Multivibrator MV comprises a pair of PNP transistors Q3 and Q4 the emitters of which are connected to the gates of the respective SCR's Q1 and Q2. The multivibrator circuit is provided with direct current through a lead L5. A reduced voltage suitable for transistor circuitry is applied to lead L5 by a voltage divider comprising a pair of resistors R5 and R6 connected between leads L3 and L4 and this voltage is filtered by a capacitor C1.

The collectors of transistors Q3 and Q4 are connected to lead L5 through respective load resistors R7 and R8. Cross coupling between the transistors is provided by a capacitor C2 which connects the collector of transistor Q3 to the base of transistor Q4 and a capacitor C3 which connects the collector of transistor Q4 to the base of transistor Q3. Current for discharging capacitor C2 and biasing the transistor Q4 is provided through a resistor R9 and current for discharging capacitor C3 and biasing transistor Q3 is provided through a resistor R10 in conventional manner. As is understood by those skilled in the art, the transistors Q3 and Q4 conduct alternately, the transistor Q4 conducting for periods determined by the relative values of capacitor C2 and resistor R9 and the transistor Q3 conducting for periods determined by the relative values of capacitor C3 and resistor R10. When each transistor conducts, current flowing through its emitter circuit forward biases the gate-cathode circuit of the respective SCR Q1 or Q2 thereby triggering it into conduction. This alternate energization of the SCR's causes the field winding sections F1A and F1B to be alternately energized in the manner described previously with reference to FIG. 1. The direction of rotation of the armature A1 is thus rapidly reversed at predetermined timed intervals.

In the embodiment of FIG. 2, the armature A1 is connected across leads L3 and L4 through a circuit which includes an SCR Q5 and a resistor R14. A conventional armature speed control circuit, designated generally as 13, is provided to control the duty cycle of SCR Q5 to maintain a fixed back E.M.F. in the armature. The speed of the armature is thus maintained at a preselected level in known manner. A diode D3 shunts the armature to permit the SCR Q5 to turn off. In maintaining a fixed back E.M.F., the speed control circuit 13 utilizes the voltage developed across resistor R14 in compensating for the resistive voltage drop component in the total armature voltage. Circuits, such as that indicated at 13, for maintaining a predetermined back E.M.F. are well known and are therefore not described in detail herein. Since the polarity of the armature voltage does not change when the direction of rotation reverses, the speed control circuit 13 operates in both directions. Thus, as the direction of rotation of the armature is periodically reversed by the alternate energization of the field winding sections F1A and F1B under the control of the multivibrator circuit MV, the speed of rotation of the armature A1 in the particular direction chosen is maintained at a preselected level.

Figure 3:
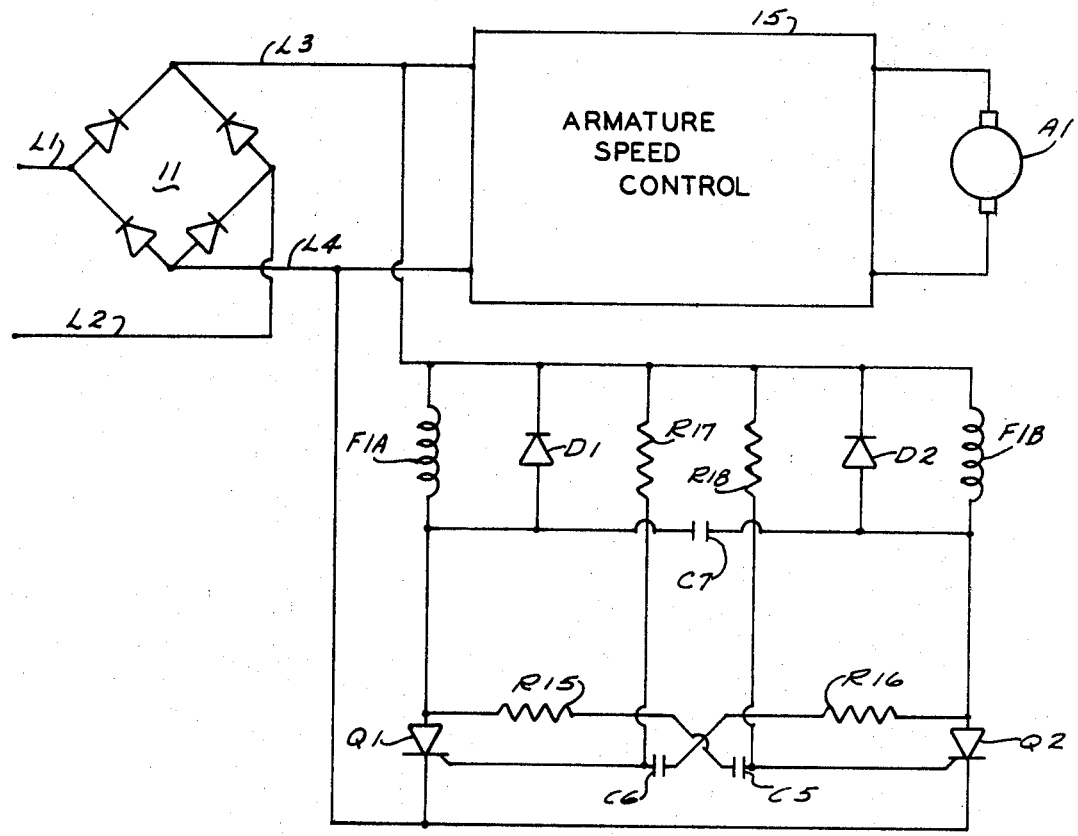
FIG. 3 is a schematic circuit diagram of a further embodiment employing an SCR multivibrator for reversing a D.C. motor.

In the embodiment of FIG. 3, the energization of the armature A1 is controlled by an armature speed control circuit 15 which may be substantially similar to that indicated at 13 in FIG. 2. The field winding sections F1A and F1B are alternately energized at timed intervals in this embodiment also to provide periodic reversing of the armature. However, in this embodiment the SCR's Q1 and Q2 are themselves interconnected by suitable cross coupling networks to thereby constitute an astable multivibrator circuit which provides timed reversals. The anode of SCR Q1 is connected to the gate of SCR Q2 through a circuit which includes a current limiting resistor R15 and a capacitor C5 and the anode of SCR Q2 is connected to the gate of SCR Q1 through a current limiting resistor R16 and a capacitor C6. Current for discharging capacitor C6 and for triggering SCR Q1 is provided from lead L3 through a resistor R17 and current for discharging capacitor C5 and for triggering SCR Q2 is provided through a resistor R18. The anodes of the two SCR's are connected to each other through a capacitor C7 which, as will be understood by those skilled in the art, provides a commutating function.

When one or the other of the SCR's, e.g., SCR Q1, is triggered by current flowing through the respective resistor (R17), it starts to conduct and energizes the respective field winding (F1A). Simultaneously, the negative field winding (F1A). Simultaneously, the negative-going voltage pulse which is generated at the anode of the triggered SCR's coupled, through the respective cross coupling capacitor (C5), to the gate of the other SCR (Q2). Accordingly, this second SCR is prevented from being turned on until the cross coupling capacitor (C5) is discharged by current through the respective resistor (R18). After the capacitor is discharged, the previously deenergized SCR (Q2) is triggered into conduction, thereby applying the unidirectional source voltage to previously deenergized field winding section (F1B). As the newly energized SCR (Q2) starts to conduct, the negative-going pulse generated at its anode is coupled, through capacitor C7, to the anode of the previously conducting SCR (Q1) thereby turning it off. Simultaneously, this negative-going voltage is coupled, through the respective cross coupling capacitor (C6), to the gate of the previously conducting SCR (Q1) thereby preventing it from again being triggered by current flowing through the respective biasing resistor (R17) until that capacitor (C6) is discharged. After that capacitor is discharged, the SCR's again switch roles thereby again reversing the energization of the field winding sections. From the foregoing it can be seen that the SCR's conduct alternately and that the field winding sections F1A and F1B are thus alternately energized at timed intervals, the period of energization of each being determined by the time constant of the respective cross coupling network, resistor R17 and capacitor C6 or resistor R18 and capacitor C5.

The embodiment of FIG. 3 has the advantage over the embodiments of FIGS. 1 and 2 that either a pulsating or a non-pulsating direct current power source may be used.

Periodic reversal of the drive provided by the D.C. motor in the embodiments of FIGS. 2 and 3, may, for example, be utilized to provide agitation in a washing machine or to provide periodic reversal of the direction of tumbling in a clothes dryer so as to prevent tangling of items being dried. In either embodiment providing timed reversals, the periodic reversing action can be terminated by cutting off the source of current which discharges one or the other of the cross coupling capacitors. In a dryer this terminating action may, if desired, be controlled by automatic dryness sensing circuitry of the type known in the art.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A reversible drive system comprising:
   a D.C. shunt motor having an armature and a pair of alternately energizable field winding sections;
   circuit means for connecting said armature across a unidirectional current source;
   respective circuit means, each including a triggerable semiconductor current switching device in series with a respective one of said winding sections for selectively connecting said field winding sections across said unidirectional current source in shunt with said armature, said winding sections being polarized with respect to each other to produce rotation of said armature in opposite directions;
   a respective diode shunting each of said winding sections; and
   means for continuously alternatively energizing said switching devices so as to continuously alternately energize said winding sections in order to produce continuous reversible rotation of said armature.

2. A drive system as set forth in claim 1 wherein said field winding sections together comprise a center-tapped field winding.

3. A drive system as set forth in claim 1 wherein said unidirectional current source provides pulsating direct current.

4. A drive system as set forth in claim 3 wherein said unidirectional current source comprises a full wave bridge rectifier.

5. A drive system as set forth in claim 1 wherein said switching devices comprise SCR's.

6. A drive system as set forth in claim 5 including a bleed resistor shunting each of said SCR's.

7. A drive system as set forth in claim 5 wherein said means for alternately energizing said switching devices includes cross coupling means which, with said swtching devices, comprise an astable multivibrator.

8. A drive system as set forth in claim 5 wherein said means for alternately energizing said switching devices comprises a transistor multivibrator.

9. A drive system as set forth in claim 1 including means for maintaining the back E.M.F. in said armature at a preselected level thereby to maintain the speed of said armature at a preselected level in either direction of rotation.

10. A reversible drive system comprising:
    a D.C. shunt motor having an armature and a pair of alternately energizable field winding sections;
    circuit means for connecting said armature across a unidirectional current source;
    a respective diode shunting each of said winding sections;
    respective circuit means, each including an SCR in series with a respective one of said winding sections for selectively connecting said field winding sections across said unidirectional current source in shunt with said armature, said winding sections being polarized with respect to each other to produce rotation of said armature in opposite directions;
    a first resistor-capacitor network for coupling the anode of one of said SCR's to the gate of the other of said SCR's;
    a second resistor-capacitor network for coupling the anode of said other SCR to the gate of said one SCR; and
    a commutating capacitor connecting the anode of said one SCR to the anode of said other SCR to cause said SCR's to conduct alternately in order to continuously alternately energize said oppositely polarized field winding sections to continuously produce periodically reversing rotation of said armature.

11. A reversible drive system comprising:
    a D.C. shunt motor having an armature and a pair of alternately energizable field winding sections;
    a respective diode shunting each of said winding sections;
    circuit means for connecting said armature across a pulsating unidirectional current source;
    respective circuit means, each including an SCR in series with a respective one of said winding sections for selectively connecting said field winding sections across said unidirectional current source in shunt with said armature, said winding sections being polarized with respect to each other to produce rotation of said armature in opposite directions; and
    an astable transistor multivibrator including a pair of transistors which are adapted to continuously conduct alternately, the emitter of each transistor being connected to the gate of a respective one of said SCR's so as to continuously trigger alternately said SCR's into conduction in order to provide continuous timed reversals of the direction of rotation of said armature.

References Cited

UNITED STATES PATENTS

| 3,008,136 | 11/1961 | McCoy | 318—301 |
| 3,090,897 | 5/1963 | Hammann | 318—341 |
| 3,184,670 | 5/1965 | Reynolds | 318—356 |
| 3,199,011 | 8/1965 | Sikorra | 318—356 |
| 3,302,089 | 1/1967 | Rosa et al. | 318—356 |
| 3,359,478 | 12/1967 | Yates | 318—345 |

ORIS L. RADER, Primary Examiner

K. L. CROSSON, Assistant Examiner

U.S. Cl. X.R.

318—132, 281, 297